United States Patent
Murugappan et al.

(10) Patent No.: US 11,015,570 B2
(45) Date of Patent: May 25, 2021

(54) WIND TURBINE ROTOR BLADE ROOT INSERT WITH INTEGRATED FLANGE MEMBER

(71) Applicant: General Electric Company, Schenectady, NY (US)

(72) Inventors: Revathy Murugappan, Bangalore (IN); Afroz Akhtar, Bangalore (IN); David Patrick Cripps, Newchurch (GB)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 15/446,209

(22) Filed: Mar. 1, 2017

(65) Prior Publication Data
US 2018/0252200 A1    Sep. 6, 2018

(51) Int. Cl.
*F03D 1/06* (2006.01)
*F03D 80/30* (2016.01)

(52) U.S. Cl.
CPC ............ *F03D 1/0658* (2013.01); *F03D 80/30* (2016.05); *F05B 2230/20* (2013.01); *F05B 2230/60* (2013.01); *Y02E 10/72* (2013.01); *Y02P 70/50* (2015.11)

(58) Field of Classification Search
CPC ...... F03D 1/06; F03D 1/0658; F03D 11/0008; F05B 2240/50; F05B 2260/301; Y02E 10/721
USPC .................................. 416/146 R, 205, 229 R
See application file for complete search history.

(56) References Cited

U.S. PATENT DOCUMENTS

| | | | | |
|---|---|---|---|---|
| 4,207,029 A | * | 6/1980 | Ivanko ................. | F01D 5/3084 416/220 R |
| 4,412,784 A | * | 11/1983 | Wackerle .............. | B64C 27/473 416/229 R |
| 4,417,854 A | * | 11/1983 | Cain ....................... | F01D 5/284 416/219 R |
| 4,915,590 A | * | 4/1990 | Eckland ................ | F03D 1/0658 29/889.21 |
| 7,249,935 B2 | * | 7/2007 | Pedersen ................. | F03D 80/30 416/146 R |
| 7,780,417 B2 | * | 8/2010 | Kirchner ............... | F03D 1/0658 416/155 |
| 8,172,538 B2 | * | 5/2012 | Hancock ............... | F03D 1/0658 264/101 |
| 9,464,622 B2 | | 10/2016 | Caruso | |
| 2010/0260603 A1 | * | 10/2010 | Dawson ................ | F03D 1/0675 416/87 |

(Continued)

*Primary Examiner* — John Kwon
*Assistant Examiner* — Johnny H Hoang
(74) *Attorney, Agent, or Firm* — Dority & Manning, P.A.

(57) ABSTRACT

A rotor blade assembly for a wind turbine includes a pressure side and a suction side extending between a leading edge and a trailing edge. A generally cylindrical blade root section has a flush root end configured to attach the rotor blade assembly to a hub. A plurality of span-wise extending root inserts are disposed around and molded into the cylindrical blade root section, with each root insert having an end face and defining an internally threaded bore configured for receipt of a bolt member for attaching the rotor blade assembly to the hub. A metallic flange is disposed at an end of one of the root inserts. The metallic flange is flush with the end faces of adjacent root inserts such that the metallic flange and end faces of the root inserts lie in a common flush plane of the root end.

16 Claims, 6 Drawing Sheets

(56) References Cited

U.S. PATENT DOCUMENTS

| | | | |
|---|---|---|---|
| 2011/0142636 A1* | 6/2011 | Curtin | F03D 1/0658 |
| | | | 416/62 |
| 2012/0134833 A1* | 5/2012 | Mashue | F03D 1/0658 |
| | | | 416/204 R |
| 2013/0177428 A1 | 7/2013 | Zeller et al. | |
| 2014/0119926 A1 | 5/2014 | Bussieres et al. | |
| 2014/0271190 A1 | 9/2014 | Hansen | |
| 2015/0167641 A1* | 6/2015 | Moller | F03D 1/0658 |
| | | | 416/174 |
| 2015/0167642 A1 | 6/2015 | Hansen | |
| 2017/0002660 A1* | 1/2017 | Samudrala | F03D 1/0658 |

* cited by examiner

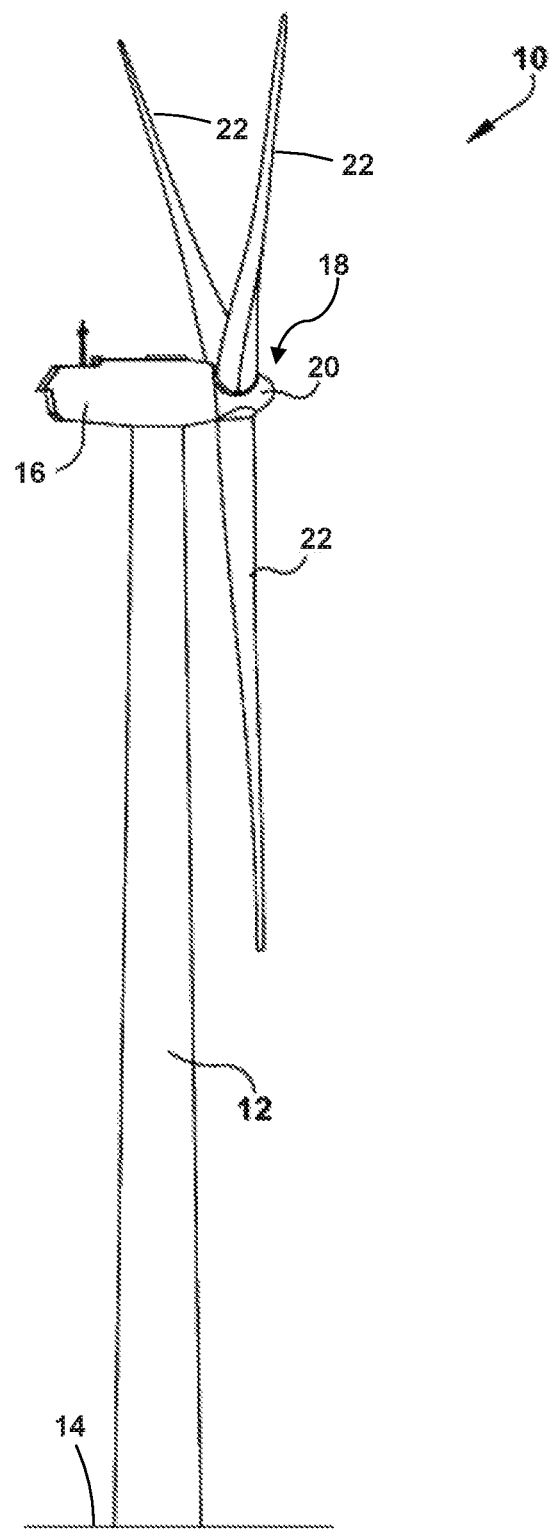
FIG. -1-

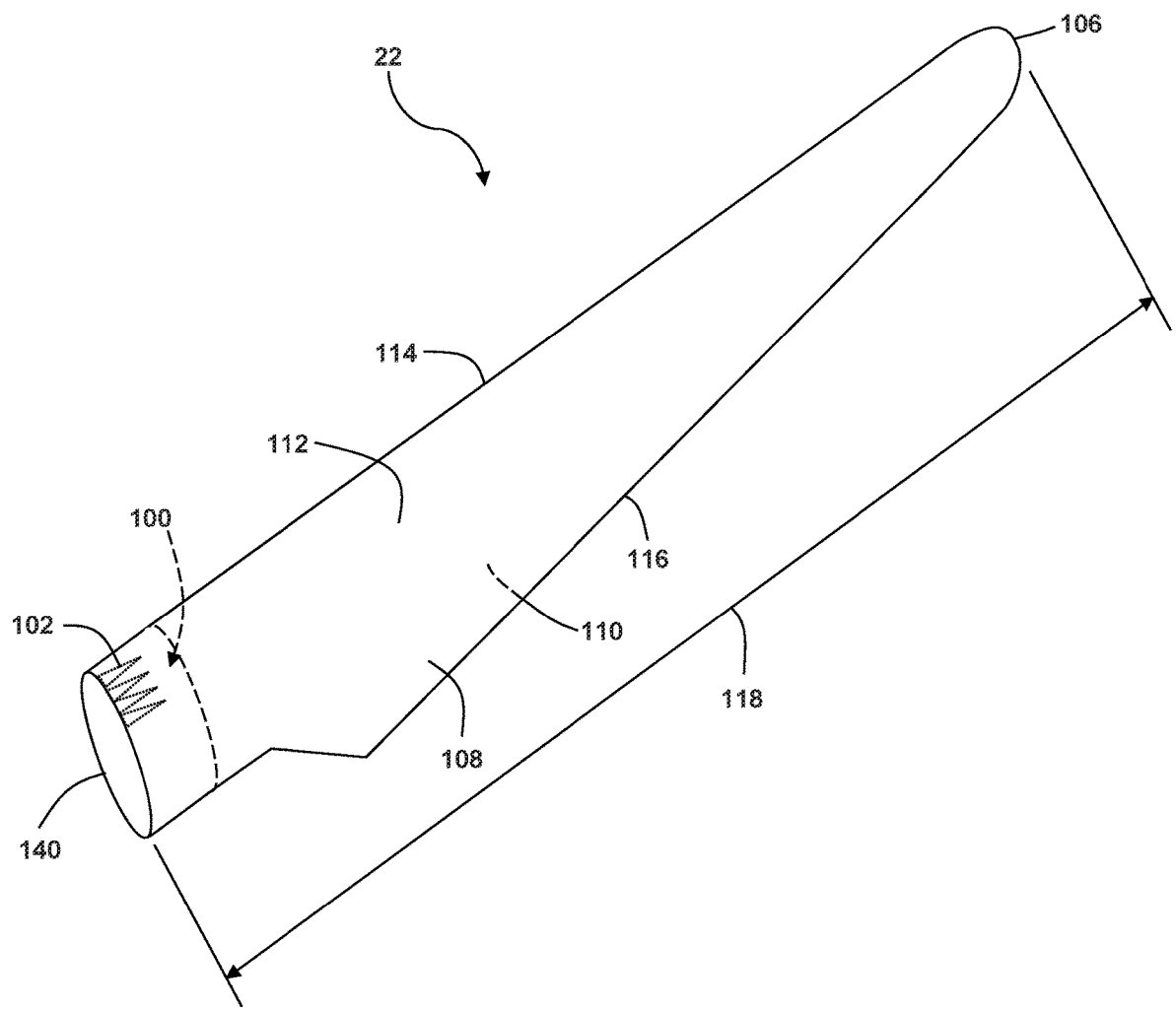
FIG. -2-

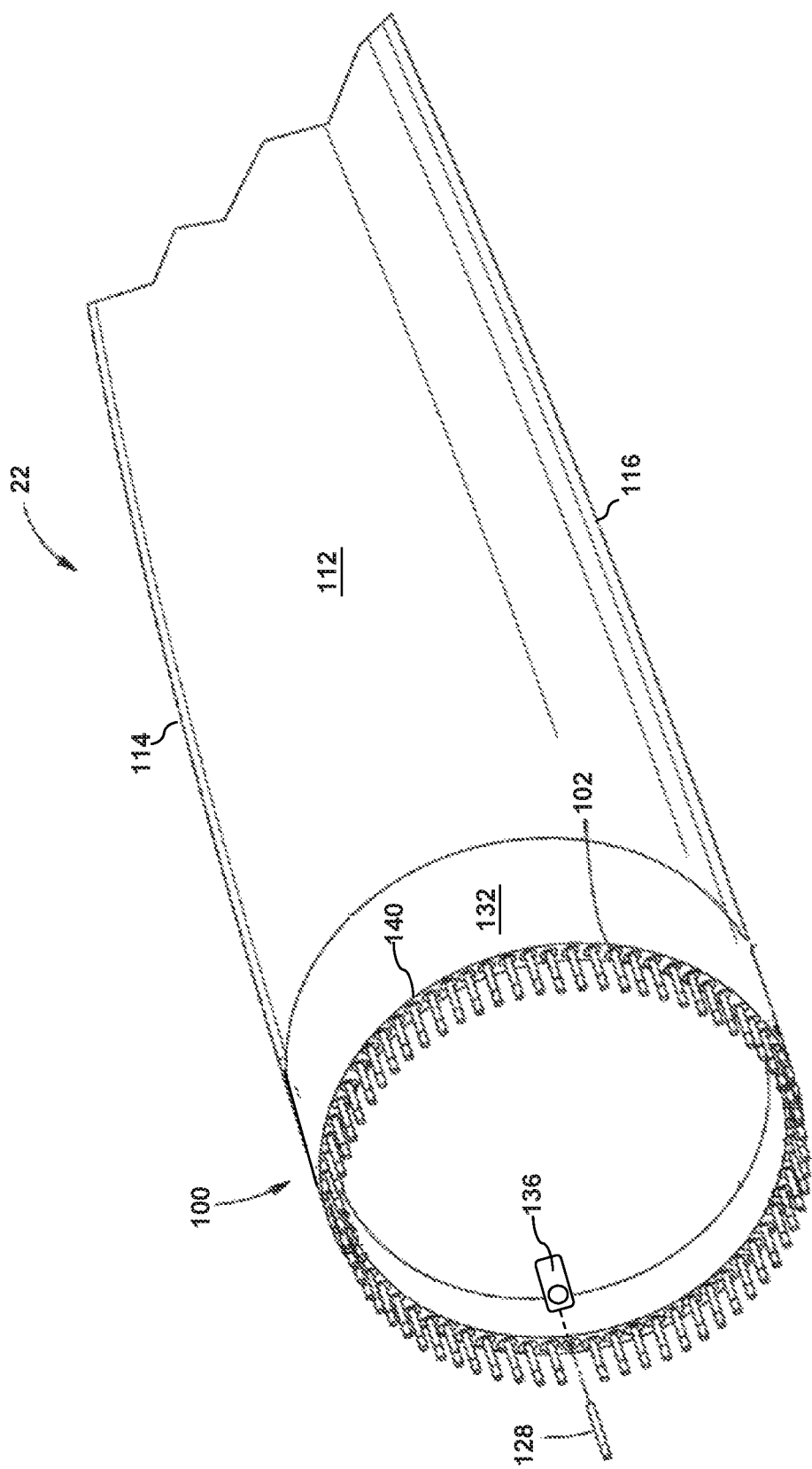
FIG. -3-

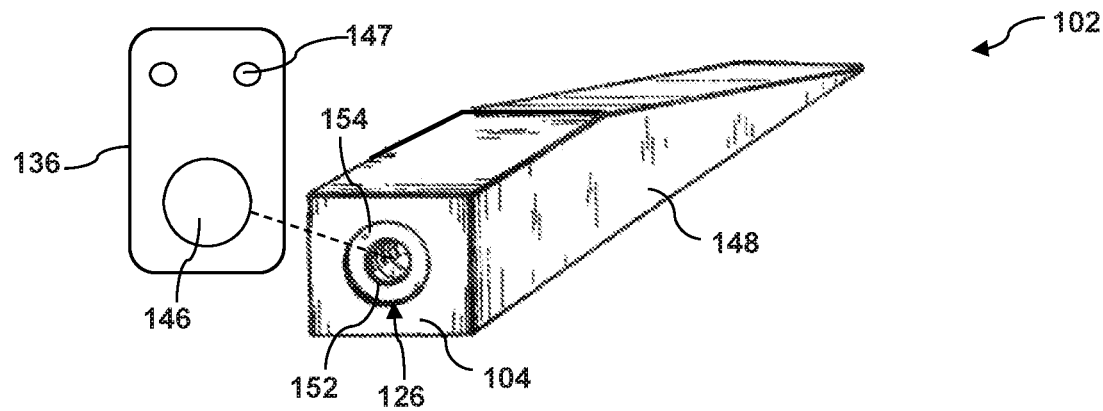
FIG. -4-
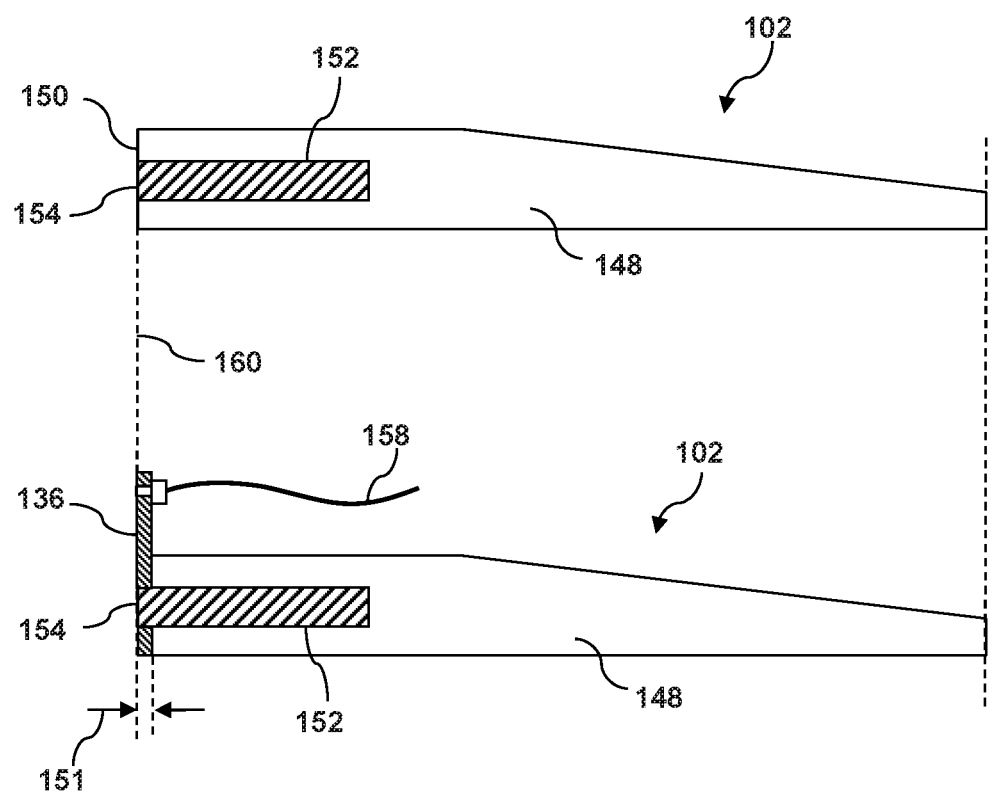
FIG. -5-

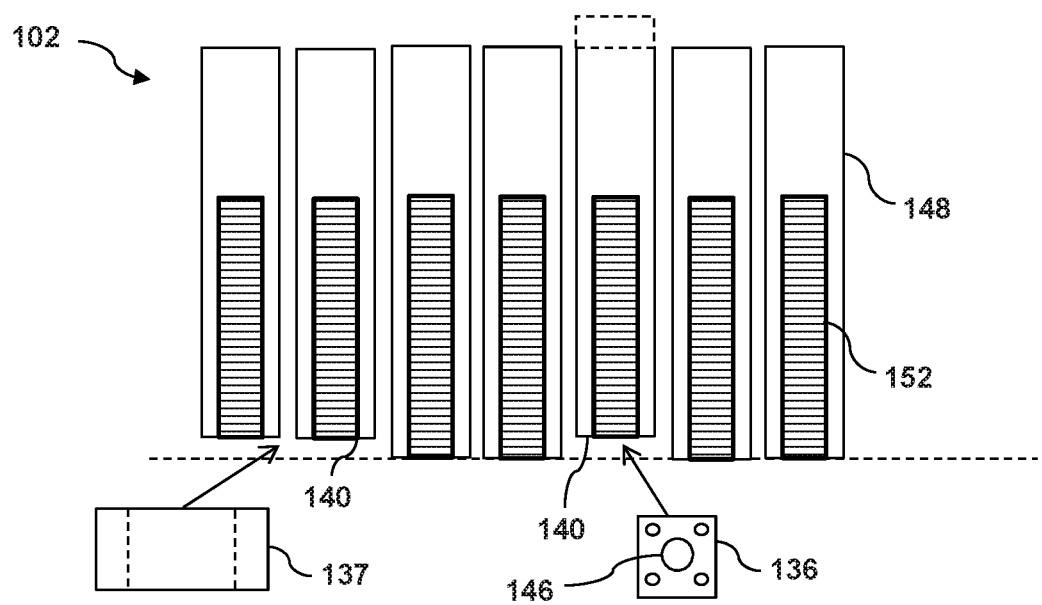
FIG. -6-
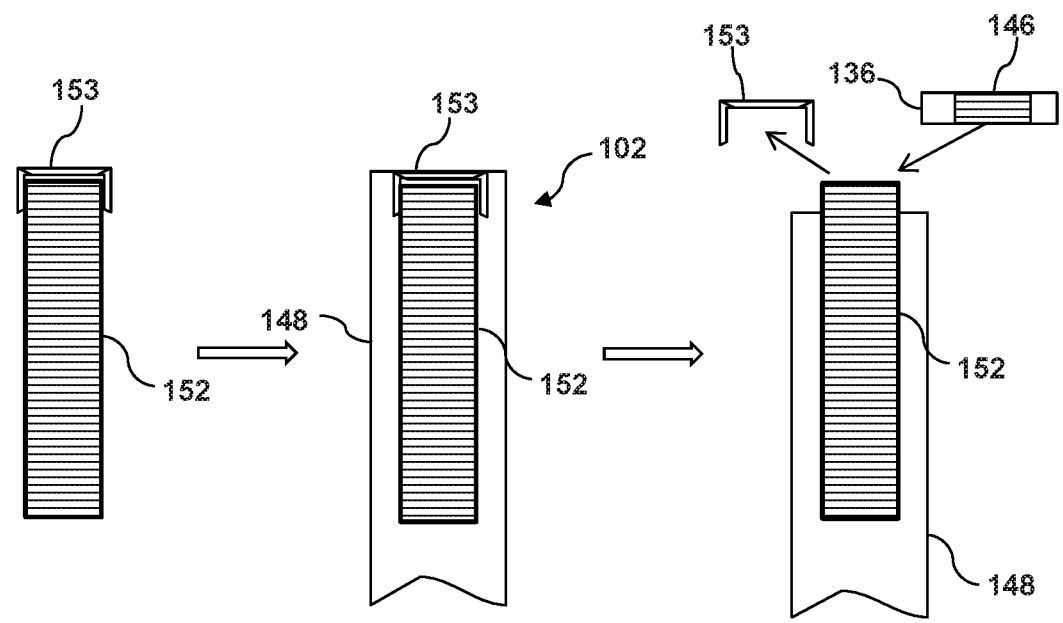
FIG. -7-

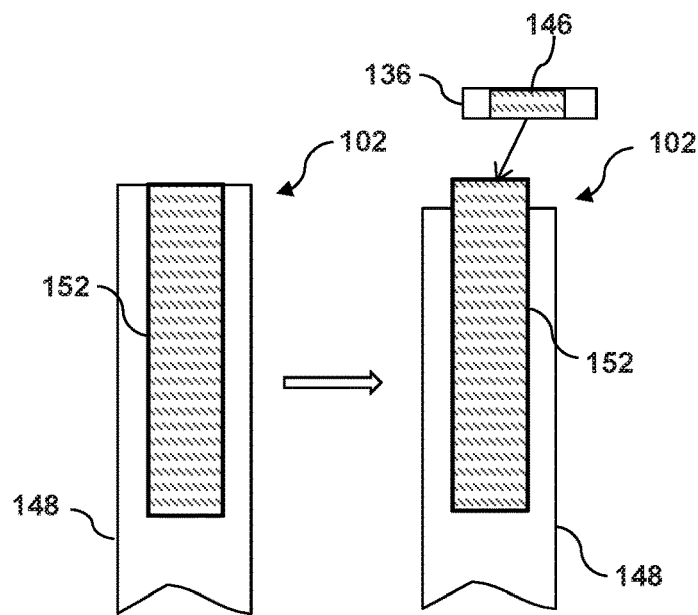
FIG. -8-
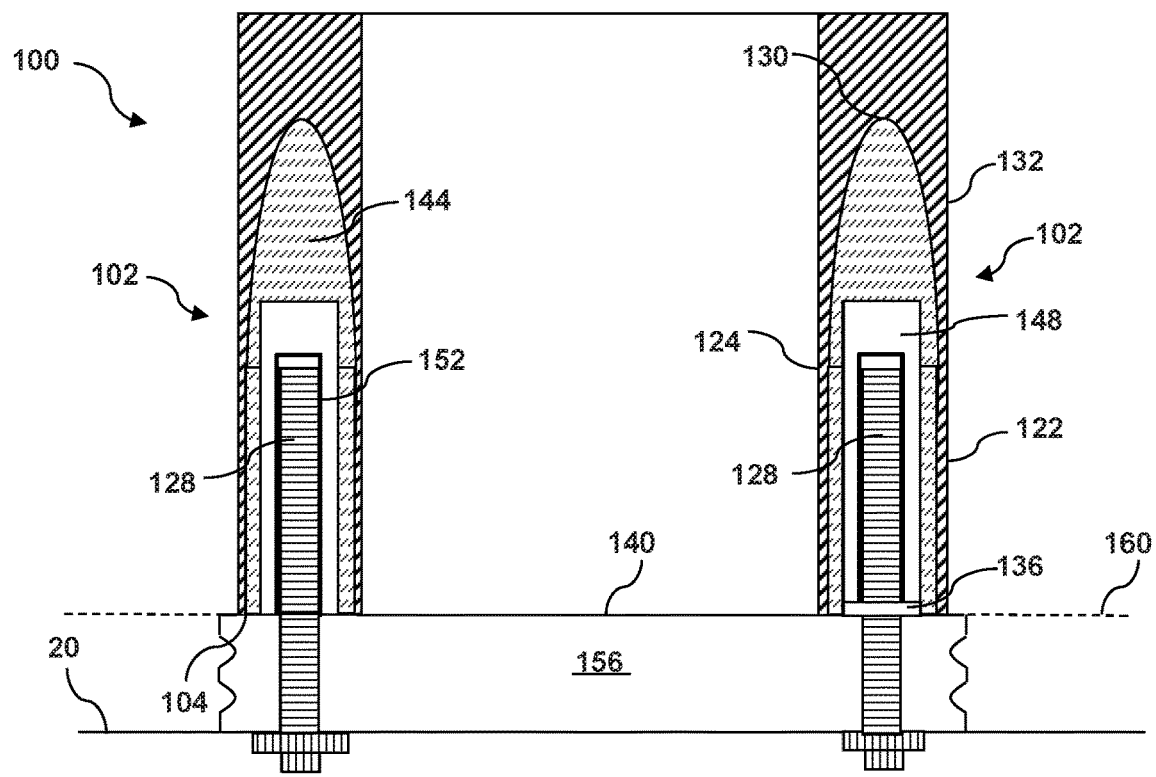
FIG. -9-

WIND TURBINE ROTOR BLADE ROOT INSERT WITH INTEGRATED FLANGE MEMBER

FIELD OF THE INVENTION

The present subject matter relates generally to wind turbines and, more particularly, to a root configuration of a wind turbine rotor blade assembly having an integrated flange that may be used in a lightning protection system, pitch control system, or other system.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

The likelihood of structural failure due to fatigue at the rotor blade joint is typically increased by the presence of high stress concentration between the load bearing components, manufacturing defects, unexpected loading events or deterioration of the joint. Loss of preload can also occur in the bolted joint which is known to reduce fatigue life. To endure the load envelope specific to the rotor blade root, various methods and systems have been devised and implemented to improve the connection between the dissimilar materials intrinsic to the rotor components. For example, some systems consist of a blade root having a flange, wherein the flange is bolted to the hub. In other systems, a threaded insert is bonded or infused with the blade root laminate and a bolt (i.e. the load bearing component) is screwed therein. In still additional systems, low-cost, low-density foam is inserted between the bolts and inserts. T-bolt connections are well-known in other systems.

It also well-understood that there is a significant risk of lightning strikes on erected wind turbines, with the rotor blades being most at risk. Thus, systems are used to conduct the lightning strike from the rotor blade, via the rotor hub, nacelle, and tower to ground. For example, U.S. Patent Application Publication No. 2013/0177428 describes root-end connection of a rotor blade wherein block-like trapezoidal fastening elements are embedded in a space between inner and outer legs of the fiber reinforced blade material. Each fastening element has an internally threaded borehole defined therein for receipt of a connecting bolt or screw. At the head side facing towards an interior of the blade, the fastening element is formed with a metal connector projection that extends perpendicular to the borehole through a hole in the blade material. A lightning conductor cable attaches to the projection.

Likewise, WO 2013/075990 describes a wind turbine blade wherein a lightning down conductor is coupled to a blade root bushing at the root end of the blade by drilling through the internal laminate layers of the shell body to define an aperture that is perpendicular to the bushing. A bolt through the aperture electrically connects the conductor to the bushing.

U.S. Patent Application Publication No. 2008/0206059 describes a system that incorporates elongated fastening members embedded in the root end of the wind turbine blade with prefabricated sticks that surround a substantial longitudinal part of the fastening member. A rod extends longitudinally from the fastening member and a conductive sheet of metal is connected to the rod to serve as a conductive lightning transfer means.

Accordingly, the industry is seeking improved, efficient, and cost-effective means to incorporate lightning protection system (LPS) connectors with the root end configurations of wind turbine blades, particularly with root end insert devices.

BRIEF DESCRIPTION OF THE INVENTION

Aspects and advantages of the invention will be set forth in part in the following description, or may be obvious from the description, or may be learned through practice of the invention.

In accordance with one embodiment of the invention, a rotor blade assembly for a wind turbine having a metallic flange integrated with a root insert is disclosed. The metallic flange may be used for various purposes. For example, the flange may be a component in a lightning protection system and configured for receipt of a conductor, or the like. The flange may also be used as a striker plate in a pitch control system. It should be appreciated that the invention is not limited to a particular use of the flange, and reference to use in a lighting protection system herein is for illustrative purposes only.

The rotor blade assembly includes a pressure side and a suction side, the pressure side and suction sides extending between a leading edge and a trailing edge. A generally cylindrical blade root section has a flush root end that is configured to attach the rotor blade assembly to a hub. A plurality of span-wise extending root inserts are disposed around and molded into the cylindrical blade root section. Each root insert has an end face and defines an internally threaded bore configured for receipt of a bolt member for attaching the rotor blade assembly to the hub. The metallic flange is disposed at an end of at least one of the root inserts and, as mentioned, may be configured for receipt of a lightning protection system component, such as a cable that runs within the blade assembly, or may be configured as a striker plate in the wind turbine's pitch control system. The metallic flange may span a single root insert, or may span across multiple root inserts. The metallic flange is flush with the end faces of adjacent root inserts such that the metallic flange and end faces of the root inserts lie in a common flush plane of the root end.

In a particular embodiment, each root insert comprises a prefabricated elongated block-shaped member that is molded into the blade root section. With this embodiment, each root insert may have an internally threaded metallic cylinder molded into the block-shaped member, wherein the metallic cylinder defines the threaded bore. The metallic cylinder may have an end face that lies in the common flush plane of the root end, even for the root insert that includes the metallic flange. Likewise, the block-shaped member of the root inserts also has an end face that lies in the common flush plane of the root end except for the root insert that includes the metallic flange. For this particular root insert, a portion of the material of the block member at the end face thereof corresponding to the thickness of the metallic flange is removed (or not included in the initial production of the block member) so that the metallic flange lies flush with the end faces of adjacent block members. The metallic cylinder may extend into a hole in the metallic flange in one embodiment, or the metallic flange may lie flush against the cylinder in another embodiment.

Various methods and configurations for accommodating the metallic flange at the end face of the insert are within the scope and spirit of the invention and are described in greater detail below with reference to the figures.

In certain embodiments, the blade root section comprises a span-wise end portion defined by an inner circumferential component and an outer circumferential component, wherein the inner and outer circumferential components are separated by a radial gap. The root inserts disposed in the radial gap and bonded to the inner and outer circumferential components.

In assembly of the rotor blade with a wind turbine, the end face of the root section may be connectable to a pitch bearing operably configured between the rotor blade assembly and the hub.

In another embodiment, a wind turbine having a tower; a nacelle configured atop the tower; and a rotor having a rotatable hub and at least one rotor blade assembly is disclosed. The at least one rotor blade assembly may be configured in accordance with any of the embodiments discussed above.

The invention also encompasses various methods for forming a generally cylindrical blade root section of a wind turbine rotor blade assembly, the blade root section having a flush root end configured to attach the rotor blade assembly to a hub. The method includes molding a plurality of span-wise extending root inserts into the cylindrical blade root section, each root insert comprising an end face and an internally threaded bore configured for receipt of a bolt member for attaching the rotor blade assembly to the hub. The method includes attaching or otherwise locating a metallic flange at an end of at least one of the root inserts. The method also includes fitting the metallic flange onto the end face so that the metallic flange and end faces of adjacent root inserts lie in a common flush plane of the root end.

One method embodiment may include forming each root insert as a block-shaped member with an internally threaded metallic cylinder molded into the block-shaped member and defining the threaded bore. The metallic flange may have a bore defined therethrough, with the method further comprising engaging an exposed end of the metallic cylinder in the bore and press fitting the metallic flange onto the end face of the first one of the root inserts.

In another method, the metallic flange has an internally threaded bore defined therethrough, wherein the method includes engaging an exposed threaded end of the metallic cylinder with the threaded bore and threading the metallic flange onto the metallic cylinder. Initial steps of the method may include providing a threaded cap onto the threaded end of the metallic cylinder, forming the root insert around the metallic cylinder, subsequently removing root insert material from around the cap, and then removing the cap to expose the threaded end of the metallic cylinder before threading the metallic flange onto the metallic cylinder.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade assembly of a wind turbine according to the present disclosure;

FIG. 3 illustrates an enlarged view of a root end portion of the rotor blade assembly of FIG. 2 according to the present invention;

FIG. 4 illustrates a partial perspective view of a root insert and associated metallic LPS flange of one embodiment of the rotor blade assembly according to the present disclosure;

FIG. 5 illustrates a view of adjacent root inserts in accordance with aspects of the invention;

FIG. 6 depicts an embodiment for attaching one or more of the metallic flanges onto an end of one of the root inserts;

FIG. 7 depicts an alternate embodiment for attaching the metallic flange;

FIG. 8 depicts still another embodiment for attaching the metallic flange; and

FIG. 9 illustrates a partial cut-away view of a portion of a rotor blade assembly according to the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention discloses a wind turbine and a rotor blade assembly for the wind turbine having a lightning protection system (LPS) flange incorporated with a root insert in the blade root section.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade assembly 22 coupled to and extending outwardly from the hub 20. For example, in the illustrated embodiment, the rotor 18 includes three rotor blade assemblies 22. However, in an alternative embodiment, the rotor 18 may include more or less than three rotor blade assemblies 22. Each rotor blade assembly 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

As mentioned, wind turbines 10, particularly the blades 22, are susceptible to lightning strikes due to their structure and generally remote locations. For this reason, the wind turbines 10 are generally equipped with various lightning protection systems. Such systems typically include one or more lightning receptors mounted on each blade 10, with a conduit or cable system internal to the blade structure for conducting strikes from the receptors, through the blade 22, to the hub 20, and through the nacelle 16 and tower 12 to a ground location. A connection mechanism is thus required at the root end of the blade 22 to connect the blade conduit to a hub conduit.

Referring now to FIG. 2, there is illustrated one embodiment of a rotor blade assembly 22 with a plurality of root inserts 102 (indicated schematically) in a blade root section 100 in accordance with the present invention. More specifically, the rotor blade assembly 22 includes a shell 108 defining a pressure side 110 and a suction side 112 between a leading edge 114 and a trailing edge 116. The shell 108 may generally be configured to extend between the blade root section 100 and a blade tip 106 disposed opposite the blade root section 100 and may serve as the outer casing/covering of inner load bearing structure of the blade. Further, the rotor blade assembly 22 may have a span 118 defining the total length between the blade root section 100 and the blade tip 106. The blade root section 100 may have a generally cylindrical shape and may extend span-wise from the pressure side 110 and suction side 112 to an end face 140 of the root section 104. Further, the blade root section 100 may be configured to attach the rotor blade assembly 22 to the hub 18 of the wind turbine 10 (FIG. 1). The root inserts 102 are disposed within the blade root section 100, and will be discussed in greater detail below.

Referring to FIGS. 3 through 9 in general, the generally cylindrical blade root section 100 has a flush root end 140 that is configured to attach the rotor blade assembly 22 to the hub 20. The root end 140 is "flush" in that the entirety of the circumferential surface thereof lies in a common plane 160 (FIGS. 5 and 6), thus making it easier to mound the root end 140 to a pitch bearing 156 (FIG. 9) or intermediate member, such as a stiffening ring, between the root end 140 and pitch bearing 156.

A plurality of span-wise extending root inserts 102 are disposed around and molded into the cylindrical blade root section 100. Each root insert 102 has an end face 104 and defines an internally threaded bore 126 exposed at the end face 104 and configured for receipt of a bolt member 128 for attaching the rotor blade assembly 22 to the hub 20. FIG. 3 depicts a bolt member 128 threaded into each of the root inserts 102.

A metallic flange 136 is fitted onto an end of at least one of the root inserts 102. The term "flange" is used herein to encompass essentially any type of plate-like member. In one embodiment, the flange 136 is configured for receipt of a lightning protection system component 158, such as a cable or other conductor as depicted in FIG. 5 that runs within the blade assembly 22. It should be appreciated that the component 158 may be an insert, a plate, or any other type of component used in conventional lightning protection systems in wind turbines. In another embodiment, the metallic flange may be configured as a striker plate 137 (as depicted in FIG. 6) that spans across one or more of the root inserts 102 and is used in a pitch control system for the wind turbine, as is known by those skilled in the art. The metallic flange 136 is flush with the end faces 104 of adjacent root inserts 102 such that the metallic flange 136 and end faces 104 of the root inserts lie in the common flush plane 160 of the root end face 140. In this manner, the flange 136 does not protrude span-wise beyond the flush plane 160 and the root insert 102 with the flange 136 is essentially indistinguishable from the other root insert 102 for purposes of mounting the root section end face 140 to the pitch bearing 156.

As depicted in FIG. 6, the flange 136 may be attached to a single root insert 102 or, depending on the required size of the flange, may span across multiple root inserts 102 (for example if the flange is configured as a striker plate 137). The striker plate may be T-shaped where it is attached to a single insert 102, yet spans over multiple inserts 102.

In a particular embodiment, each root insert 102 comprises a prefabricated elongated block-shaped member 148 (FIG. 4) that is molded into the blade root section 100. With this embodiment, the internally threaded bore 126 may be defined by metallic cylinder 152 molded into the block-shaped member 148. The block member 148 may be a preformed hardened resinous material, laminate material, or other suitable structurally rigid material. The block member 148 may have an elongated tapered shape, such as the tapered trapezoidal shape depicted in FIG. 4. The metallic cylinder 152 may have an end face 154 that lies in the common flush plane 160 of the root end face 140. Likewise, the block-shaped member 148 has an end face 150 that lies in the common flush plane 160 of the root end face 140 except for the root insert 102 that includes the metallic flange 136. As depicted in the particular embodiment of FIG. 5, for the root insert 102 that includes the metallic flange 136, a portion of the material of the block member 148 at the end face 150 thereof corresponding to the thickness 151 of the metallic flange 136 is removed by machining or other process so that the metallic flange 136 lies flush with the end faces 150 of adjacent block members 148. As depicted in FIG. 5, the cylinder 152 may extend into the hole 146 in the flange 136 such that the cylinder end face 154 is flush with the outer face of the flange 136. In an alternate embodiment, the block member 148 and metallic cylinder 152 for the particular root insert that incorporates the metallic flange 136 may be manufactured with an initial span-wise length that is shorter than the adjacent block members 148 to accommodate the thickness of the metallic flange 136, as depicted in FIG. 6, wherein the flange 136 lies essentially flush against the cylinder end face 154.

In still another embodiment depicted by the dashed line section of the root insert 102 that will receive the metallic flange 136, all of the inserts 102 may have the same length. The particular insert 102 intended for the metallic flange 136 may simply be molded "deeper" into the root end of the blade to accommodate the thickness of the flange 136.

Referring particularly to FIG. 9, in certain embodiments, the blade root section 100 comprises a span-wise end portion 132 defined by an inner circumferential component 124 and an outer circumferential component 122. The term "circumferential component" is used herein to encompass any material configuration that defines the separate three-dimensional structures of the components 122, 124, such as separate laminates. It should also be understood that the term "circumferential" is not limited to "cylindrical", but includes the presence of any type of structure that may affect the cross-sectional shape of the root circumferential components, such as surface corrugations or other surface characteristics. The inner 124 and outer 122 circumferential components are separated by the radial gap in which the root inserts 102 are molded and bonded to the inner 124 and outer 122 circumferential components by any suitable bonding agent or material 144. The bonding agent 144 may be applied to both the inner 124 and outer 122 circumferential components and at an apex 130 of the radial gap, or any combination thereof. Placing the bonding agent 144 at the end face 104 of the insert 102 ensures transfer of the load from the blade root to the pitch bearing 156. At the apex 130, a transition material may be placed to attenuate the stiffness discontinuity between the inserts 102 to the material making up the blade shell 108.

The metallic flange 136 may be incorporated at the end face 104 of the respective root insert 102 by various means. FIG. 6 depicts an embodiment wherein the particular root insert 102 that is intended to incorporate the flange 136 is manufactured shorter than the other inserts 102 by the thickness of the flange 136. The insert 102 could be initially molded/formed at this shorter length, or could be initially made at the same length as the other inserts and then an end thereof is cut or machined by an amount corresponding to the thickness of the metallic flange 136. As mentioned, all of the inserts 102 could have the same length, wherein the particular insert 102 intended for the metallic flange 136 may simply be molded "deeper" into the root end of the blade to accommodate the thickness of the flange 136. The flange 136 can then be held against the end face 104 of the insert 102 by temporary fixing means (e.g., screws, adhesive, and so forth) so that a mounting hole 146 in the flange 136 aligns with the cylinder 152. The flange 136 is thus sandwiched between the end face 104 of the shortened insert 102 and the pitch bearing ring (or a stiffener ring if used) during subsequent manufacturing of the root end. The permanent fixation of the flange 136 is achieved when the root end of the blade is clamped to the bearing ring or stiffening ring.

FIG. 7 depicts an embodiment wherein the threaded cylinder 152 is initially provided with an internally threaded cap 153 threaded onto an end thereof. The root insert 102 is then formed around the cylinder 152 and cap 153 such that the block material 148 essentially surrounds the cap 153. The insert 102 is then machined to remove the block material 148 from around the cap 153. The cap 153 is then easily removed from the cylinder 152 to expose the threaded end thereof. Referring to the right-had view in FIG. 7, the metallic flange 136 includes an internally threaded bore 146 and is readily threaded onto the exposed threads of the cylinder 152. Desirably, the number of exposed threads on the cylinder results in the flange 136 having the desired orientation at its final tightened position against the end face 104 of the insert 102. Tightening trials can be conducted to determine the number of threads and an initial angular orientation of the flange 136 on the threads. An orientation mark can be made on the threads and flange 136 to ensure the correct starting position of the flange 136 prior to tightening.

FIG. 8 depicts an embodiment wherein the threaded cylinder 152 has a non-threaded outer surface. Again, the insert 102 is machined to expose an end of the cylinder. In this embodiment, the mounting hole 146 defined in the metallic flange 136 has a diameter that is slightly smaller than the diameter of the metal cylinder 152. The flange 136 can be heated and press-fitted onto the exposed end of the cylinder 152 such that the cylinder 152 engages in the hole 146.

The metallic flange 136 may include any suitable structure for connecting the conduit or cable 158 thereto. For example, the flange 136 may include mounting holes 147 that allow for a bolted connection of the cable 158 via a bracket or other fastener.

As mentioned, the invention also encompasses a wind turbine 10 having at least one rotor blade assembly 22 as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a pressure side and a suction side, the pressure side and suction side extending between a leading edge and a trailing edge;
   a blade root section, the blade root section having a flush root end that is configured to attach the rotor blade assembly to a hub;
   a plurality of individual span-wise extending root inserts disposed around and individually molded into the blade root section, each individual root insert comprising an individual end face and a single internally threaded bore configured for receipt of a bolt member for attaching the rotor blade assembly to the hub;
   a metallic flange separate from the root inserts and seated flat against a recessed end of one or more, but less than all, of the root inserts such that one or more of the root inserts are non-metallic flange root inserts with end faces that extend span-wise beyond the recessed end, the metallic flange extending radially into the blade root section and comprising one of a lightning protection system component or a striker plate in a pitch control system; and
   the metallic flange flush with the end faces of the non-metallic flange root inserts such that the metallic flange and end faces of the non-metallic flange root inserts lie in a common flush plane of the root end.

2. The rotor blade assembly of claim 1, wherein each individual root insert comprises a block-shaped member molded into the blade root section, the threaded bore provided in the block-shaped member.

3. The rotor blade assembly of claim 2, wherein each root insert comprises an internally threaded metallic cylinder molded into the block-shaped member, the metallic cylinder defining the threaded bore and having an end face that lies in the common flush plane of the root end.

4. The rotor blade assembly of claim 3, wherein the block-shaped member of the non-metallic flange root inserts also comprises an end face that lies in the common flush plane of the root end, and the block-shaped member of the root inserts that include the metallic flange comprising a recessed end face, the metallic flange inserted over the threaded metallic cylinder against the recessed end face.

5. The rotor blade assembly of claim 1, wherein the end face of the root section is connectable to a pitch bearing operably configured between the rotor blade assembly and the hub.

6. The rotor blade assembly of claim 1, wherein the first one of the root inserts has a shorter span-wise length than the remaining root inserts.

7. The rotor blade assembly of claim 1, wherein all of the root inserts have a same span-wise length, the root inserts that include the metallic flange molded deeper into the blade root section to accommodate a thickness of the metallic flange.

8. A wind turbine, comprising:
a tower;
a nacelle configured atop the tower; and
a rotor coupled to the nacelle, the rotor comprising a rotatable hub
a rotor blade assembly, the rotor blade assembly, comprising:
  a pressure side and a suction side, the pressure side and suction side extending between a leading edge and a trailing edge;
  a blade root section, the blade root section having a flush root end that is configured to attach the rotor blade assembly to the hub;
  a plurality of individual span-wise extending root inserts disposed around and individually molded into the blade root section, each individual root insert comprising an individual end face and a single internally threaded bore configured for receipt of a bolt member for attaching the rotor blade assembly to the hub;
  a metallic flange separate from the root inserts and seated flat against a recessed end of one or more, but less than all, of the root inserts such that one or more of the root inserts are non-metallic flange root inserts with end faces that extend span-wise beyond the recessed end, the metallic flange extending radially into the blade root section and comprising one of a lightning protection system component or a striker plate in a pitch control system; and
  the metallic flange flush with the end faces of the non-metallic flange root inserts such that the metallic flange and end faces of the non-metallic flange root inserts lie in a common flush plane of the root end.

9. The wind turbine of claim 8, wherein each root insert comprises a block-shaped fastening member molded into the blade root section and an internally threaded metallic cylinder molded into the block-shaped member, the metallic cylinder defining the threaded bore and having an end face that lies in the common flush plane of the root end.

10. The wind turbine of claim 9, wherein the block-shaped member of the non-metallic flange root inserts also comprises an end face that lies in the common flush plane of the root, and the block-shaped member of the root inserts that include the metallic flange comprising a recessed end face, the metallic flange inserted over the threaded metallic cylinder against the recessed end fact.

11. The wind turbine of claim 8, wherein the root inserts that include the metallic flange have a shorter span-wise length than the remaining root inserts.

12. A method for forming a blade root section of a wind turbine rotor blade assembly, the blade root section having a flush root end configured to attach the rotor blade assembly to a hub, the method comprising:
individually molding a plurality of individual span-wise extending root inserts into the blade root section, each individual root insert comprising an individual end face and a single threaded bore configured for receipt of a bolt member for attaching the rotor blade assembly to the hub;
attaching a metallic flange separate from the root inserts and seated flat against a recessed end of one or more, but less than all of the root inserts such that one or more of the root inserts are non-metallic flange root inserts with end faces that extend span-wise beyond the recessed end, the metallic flange extending radially into the blade root section and comprising one of a lightning protection system component or a striker plate in a pitch control system; and
fitting the metallic flange onto the end face so that the metallic flange and end faces of adjacent the non-metallic flange root inserts lie in a common flush plane of the root end.

13. The method as in claim 12, further comprising forming each root insert as a block-shaped member with an internally threaded metallic cylinder molded into the block-shaped member and defining the threaded bore.

14. The method as in claim 13, wherein the metallic flange has a bore defined therethrough, the method comprising engaging an exposed end of the metallic cylinder in the bore and press fitting the metallic flange onto the end face of the root inserts.

15. The method as in claim 13, wherein the metallic flange has an internally threaded bore defined therethrough, the method comprising engaging an exposed threaded end of the metallic cylinder with the threaded bore and threading the metallic flange onto the metallic cylinder.

16. The method as in claim 15, further comprising initially providing a threaded cap onto the threaded end of the metallic cylinder, forming the root insert around the metallic cylinder, subsequently removing root insert material from around the cap, and then removing the cap to expose the threaded end of the metallic cylinder before threading the metallic flange onto the metallic cylinder.

* * * * *